May 27, 1958 R. L. LONGINI 2,836,520

METHOD OF MAKING JUNCTION TRANSISTORS

Filed Aug. 17, 1953

INVENTOR.
Richard L. Longini.
BY
Frederick Shapoe
ATTORNEY 2,836,520

METHOD OF MAKING JUNCTION TRANSISTORS

Richard L. Longini, Pittsburgh, Pa., assignor to Westinghouse Electric Corporation, East Pittsburgh, Pa., a corporation of Pennsylvania Application August 17, 1953, Serial No. 374,547

11 Claims. (Cl. 148—1.5)

This invention relates to a method of making junction transistors of the kind in which one type of donor or acceptor material is caused to alloy with a part of a body of a semiconductor material. This is done by melting a pellet of the first type of material which is a doping impurity, in contact with a larger body of the semiconductor material.

A particular feature of the invention resides in the fact that after the alloy has been formed the assembly is subjected to gradient cooling during which the molten constituent of the solid body in the molten pellet is caused to redeposit on the solid body, thereby extending in a regular and even manner the crystal lattice of the solid body. This particular type of redeposition is favorable for the reliable production of fused junctions having desirable characteristics.

The gradient cooling is preferably carried out by causing the large body of the second type of material to cool faster than the molten alloy, thereby causing some of the second type of material to solidify out of the alloy and become redeposited on the body of second type material.

The invention also contemplates means for forming a smooth interface between the pellet of the first type of material and the body of the second type of material.

The operation of a transistor is dependent upon certain materials called semiconductors, such as germanium and silicon. When one of these semiconductors contains a minute quantity of a "donor" impurity, such as antimony, it is called "N-type" material, and when it contains a minute quantity of an "acceptor" impurity, such as indium, it is called "P-type" material. A boundary face between these two materials is called a "P–N" junction.

A "junction transistor" is one in which an electrical current passing through the transistor must pass through two of these "P–N" junctions, arranged back-to-back. Thus, in one type of junction transistor, a body of "N-type" material has disposed on each of two opposite sides a body of "P-type" material. The electrical current is caused to pass first through one of the "P-type" bodies; through the "P–N" junction; through the "N-type" body; through the "N–P" junction; and then through the other "P-type" body.

Figure 1:
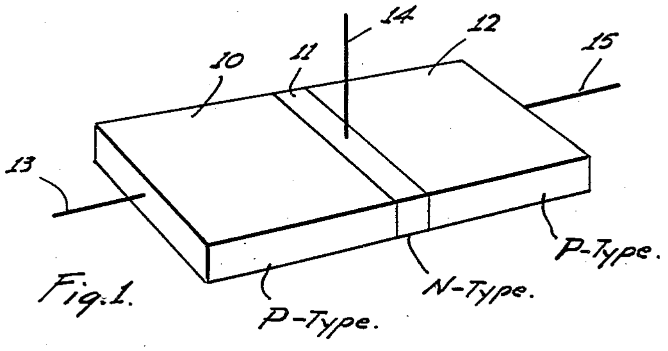
Figure 1 is a perspective schematic view of a fused junction transistor.

Fig. 1 illustrates diagrammatically a junction transistor in which 10 indicates a body of "P-type" material, 11 indicates a body of "N-type" semiconductor material, and 12 indicates another body of "P-type" material. A lead 13 is connected to the body 10, which is called the "emitter," a lead 14 is connected to the body 11, which is called the "base," and a lead 15 is connected to the body 12, which is called the "collector." These junction transistors have been made by using for the body 11 a thin wafer of "N-type" germanium material and alloying bodies 10 and 12 of "P-type" material, such as indium, to opposite sides of the wafer 11.

The junction transistor described above was known at the time of the present invention, and is mentioned herein merely for reference purposes.

The melting point of indium (156° C.) is much lower than the melting point of germanium (958° C.), and when the above assembly is heated to cause alloying, germanium is dissolved in the liquid indium. Thus, at 600° C., the molten alloy contains 22% germanium. As the temperature is lowered some of the germanium crystallizes out of the molten alloy, and is redeposited on the original body 11 of germanium, thus extending the molecular lattice of the body of germanium.

I have found that improved results may be obtained by controlling the cooling of each of the junctions between the germanium "N-type" material and the molten indium in such a manner that there is a temperature gradient with the liquid metal maintained at a higher temperature than the solid metal. Since this gradient is in opposite directions on the two sides of the relatively thin body 11 of germanium, the process is preferably conducted in separate steps as indicated in the following illustrative example.

1. *First alloy heating*

Figure 2:
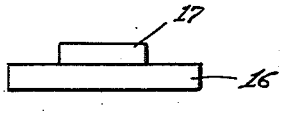
Fig. 2 is a view in elevation of a wafer of germanium with a pellet of indium placed thereon.

A relatively thin piece of "N-type" germanium, indicated diagrammatically at 16 in Fig. 2, is placed in a suitable furnace and a pellet 17 of indium is placed on top of the piece of germanium. The assembly is then heated to a temperature in the range 525° to 600° C., which can be called temperature A. While this is the preferred temperature range, it should be understood that some variation from this range is permissible. As a specific example we will select the temperature of 600° C., at which temperature the indium is molten, and forms an alloy with the germanium, with 22% of germanium dissolved in the indium.

2. *First gradient cooling*

The assembly is now subjected to a drop in temperature, which may be of the order of 15° to 30° C., (temperature drop B), under conditions which insure that the main body of germanium is cooled faster than the alloy. In other words, a temperature gradient is maintained with the liquid alloy kept hotter than the solid germanium. This cooling step may last from 5 to 20 minutes.

Figure 3:
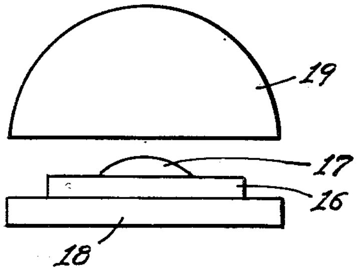
Fig. 3 is a view in elevation of the assembly of Figure 2 disposed on a graphite block and with a graphite block placed above it.

Any suitable apparatus can be used to carry out this gradient cooling. As illustrated diagrammatically in Fig. 3 the pellet 17 is now molten, and is in the form of a button of alloy on the body 16 of germanium. The body 16 rests on a block of graphite 18, and a larger cap 19 of graphite is held above the pellet 17 in order to retard its cooling. It will be understood that the pieces of graphite 18 and 19 were in place during the first heating step, so that they were heated throughout to the temperature of 600° C.

Carrying forward the specific example, the assembly is now subjected to a drop of 30° C., or to 570° C. During this cooling step, the larger cap 19 will retain its heat longer than the smaller block 18, and hence the piece of germanium 16 will cool faster and be at a lower temperature than the button 17 of alloy. Obviously the steepness of the temperature gradient can be controlled by selecting graphite pieces of different relative sizes.

The desired gradient cooling can of course be carried out by other means, as by using appropriate heating or cooling means.

At most, the temperature gradient is relatively small, and exists over a relatively short distance. Hence the temperature of 570° C. would be a "mean" of the temperatures of the liquid and the solid.

Figure 4:
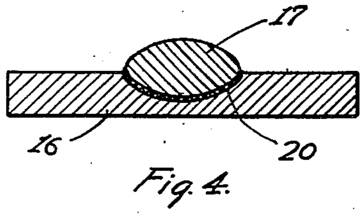
Fig. 4 is a vertical cross-section through a fused junction unit.
Figure 5:
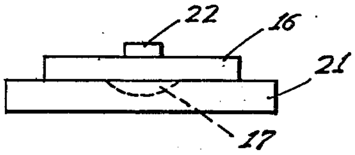
Fig. 5 is a view in elevation of the unit of Figure 4 being processed further.

During this first gradient cooling, germanium solidifies out of the cooling alloy 17 and is redeposited on the solid germanium body, as indicated diagrammatically in Fig. 4.

This figure indicates that the molten pellet 17 of alloy rests in a slight pan-like or basin-like depression caused by melting of the germanium into the alloy pellet. During the gradient cooling, due to the fact that the body 16 of germanium is cooler than the pellet 17 of alloy, germanium solidifies out of the alloy and is redeposited on the surface of the pan-like depression as indicated as a layer 20 on an exaggerated scale in Fig. 4. This redeposited germanium contains a small amount of indium, which can diffuse into the main body 16 of germanium.

In the specific example given above, the alloy at 600° C. contained 22% of dissolved germanium, and at 570° C. contains 18% of dissolved germanium. Therefore $^{18}/_{22}$ of the originally dissolved germanium is still in solution at 570° C., and $^{4}/_{22}$ of the originally dissolved germanium is redeposited. This redeposited germanium forms a thin layer, approximately 0.7 micron thick, on the germanium. From a molecular standpoint this redeposited germanium may be said to build up or extend the crystal lattice of the germanium. By extending the lattice in a regular and even manner the regeneration rate of holes and electrons near the interface will be kept low, leading to a low value of saturation current, which is a desirable characteristic.

The thickness of the layer of redeposited germanium will of course depend upon the temperatures used, and may in some cases be as thick as 10 microns.

The temperature drop selected for this first gradient heating should be sufficiently large that the layer of redeposited germanium will not be entirely redissolved during subsequent heating or by average operational fluctuations of the heat of the furnace. Thus, if this temperature drop is too small, subsequent heating steps, or operational fluctuations of furnace temperature, may bring the temperature of the assembly back up to 600° C. and thus wipe out completely the effects of the first gradient heating.

3. *First natural cooling*

During this step the assembly is removed from the furnace and is permitted to cool to normal room temperature so that the button 17 is completely solidified.

4. *Second alloy heating*

The assembly is now turned over and laid on a piece of graphite which has a surface depression to accommodate the now-solid button 17. A pellet 22 of indium, which may be smaller than pellet 17, is now placed on body 16.

The assembly is again placed in the furnace and is heated to temperature C, which is preferably slightly below the figure obtained by subtracting temperature drop B from temperature A. In the specific illustration temperature C will be approximately 565° C. [temperature A (600° C.) minus temperature drop B (30° C.)=570° C.]. This temperature is kept below 570° C. in order to avoid re-melting the germanium layer 20 which was redeposited during the first gradient cooling. At this temperature pellet 22 melts and dissolves a small amount of germanium from the body 16 to form a molten alloy button.

5. *Second gradient cooling*

The assembly is now subjected to a second gradient cooling, which may be carried out in the same manner as the first gradient cooling, but with a smaller temperature drop. This temperature drop, however, must be greater than the operational temperature fluctuations of the furnace.

In our specific illustration this temperature drop may be approximately 5° C., that is, to 560° C. This drop in temperature must be sufficient to cause the redeposition of a layer of germanium from the melt of indium and germanium alloy under the button formed when pellet 22 is melted, after the fashion indicated at 20 in Fig. 4. This redeposited germanium layer must be of sufficient thickness that it will not be wiped out subsequently by the operational fluctuations of furnace heat.

6. *Diffusion heating*

The assembly is now held at the lowered temperature (560° C. in the specific illustration) for a period long enough to permit the desired diffusion at the boundaries. In the specific illustration this period would be for about 20 minutes.

Referring to Fig. 4 it should be noted that the layer 20 of redeposited germanium is saturated with indium. During the diffusion heating, indium diffuses from this layer 20 across the boundary into the main body 16 of germanium. The distance to which the indium diffuses depends upon the time and temperature of the diffusing heating. Thus at 560° C. the indium will, in 1000 seconds, diffuse into the germanium a distance of $4\times10^{-6}$ cm. At 525° C. the same penetration of indium requires ten times as long a diffusion period.

Some diffusion of the indium into the germanium took place during the periods of gradient cooling, and therefore in some cases it may be unnecessary to employ a separate diffusion heating step.

7. *Second natural cooling*

The assembly is again removed from the furnace and is permitted to cool to room temperature so that the molten pellet 22 solidifies.

*Resulting transistor*

Figure 6:
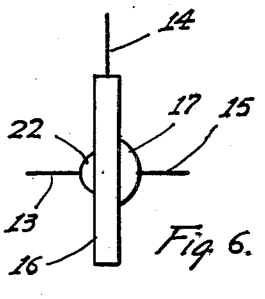
Fig. 6 is a view in elevation of a complete fused junction transistor.

The junction transistor resulting from the above process is illustrated diagrammatically in Fig. 6. The main body of germanium 16 is "N-type" material, and serves as the "base," having an attached lead 14. The indium button 17, which resulted from the first gradient cooling, formed "P-type" material adjacent its boundary with the base, and serves as the "collector." A lead 15 is connected to the "collector." The indium button 22, which resulted from the second gradient cooling, also formed "P-type" material adjacent its boundary with the base, and serves as the "emitter." A lead 13 is connected to the "emitter," and a lead 14 is connected to the "base."

The assembly is given a final treatment in an etching solution to remove surface short circuiting. For the etch a 1:1:4 solution of hydrofluoric acid, nitric acid and water is suitable.

The process of the present invention results in a favorable redeposition of germanium at each of the "P–N" junctions, but the different treatment of these two junctions results in different characteristics, the characteristics of each junction being those most desired for that particular junction.

For the collector junction it is desirable to have a minimum number of defects and trapping centers on the impurity side of the collector junction, since the current is carried by "holes." Only the "back" resistance of this junction is critical. The first gradient cooling as described above yields these desirable characteristics, and gives the collector high resistivity.

For the emitter junction it is desirable to have a large concentration gradient on the impurity side of the junction, so that a copious supply of carriers will be available. The emitter should have a low forward resistance, and the second gradient cooling as described above results in an emitter junction with low forward resistance and other good emitter characteristics.

One of the distinct advantages of this invention is that the extent of indium diffusion can be closely controlled, and since the distance between the two germanium-indium interfaces gives the working thickness of the "base," it is possible to have a very thin working "base" (desirable for good transistor qualities) while using a relatively thick piece of base material (desirable for ease of manufacture).

*Smooth interface*

When indium is melted against germanium, often the indium wets the germanium at local spots, and the germanium melts first at these spots, resulting in pits in the germanium. In order to avoid this localized wetting, with the resulting pitting, certain precautions may be taken.

One such precaution is slow heating, that is, bringing the assembly up to the alloying temperature very slowly. This slow heating will tend to cause the indium to wet and dissolve the germanium evenly over the interface. Prior investigators have considered fast heating to be preferable, but I have discovered that slow heating is of distinct advantage. By "slow heating" I mean bringing the assembly up to 525° C. in from ½ to 2 hours.

Another possible precaution is to apply a thin film of gold to the surface of the germanium block, as by the evaporation process. The gold causes the indium to wet the surface evenly, thus causing an even attack of the molten indium on the germanium.

Still another way to avoid localized wetting, with its consequent pitting, may be called "appeasement" of the indium. This method involves alloying with the indium enough germanium to saturate the indium at the wetting temperature. The amounts of germanium needed to saturate the indium at certain usable wetting temperatures are as follows:

At 325° C. need 2% germanium
At 400° C. need 5% germanium
At 500° C. need 10% germanium In the specific example given above, where the first alloy heating is carried to a temperature of 600° C., the appropriate wetting temperature may be taken as 400° C., which means that 5% germanium should be added to the indium. After this alloy is formed it is raised to a temperature of 800° C. and is then chilled rapidly to room temperature, as by oil quenching. The result of this chilling is that the germanium becomes distributed throughout the alloy in the form of small crystals in intimate contact with and surrounded by indium. Small pieces of the indium-germanium alloy thus prepared may be used for the pellets 17 and 22 in the process described above.

The process is now started by placing a pellet 17 of this indium-germanium alloy on the body 16, and the assembly is subjected to the first alloy heating described above. When the assembly reaches the temperature of 400° C. the small crystals of germanium present in the pellet 17 are first wet by the indium, since they are in favorable size and location to be completely wetted. These small crystals now dissolve in the indium, saturating it with dissolved germanium, and permitting the alloy pellet 17 to uniformly wet an area of the body 16 without dissolving any germanium from the body 16. As the temperature rises above 400° C., the indium-germanium alloy now dissolves a thin and uniform layer of germanium from the body 16. This thin and uniform layer of melted germanium will result in a thin and uniform layer of germanium being subsequently redeposited in the manner previously explained.

The principle of "appeasement" has been explained above in connection with the use of germanium as the material of the main body 16, and of indium as the material of the pellet 17. It should be understood, however, that any materials having similar properties may be substituted for germanium and indium, the important consideration being that the material used for the pellet 17 be "appeased" with the material to be used for the main body 16.

It is important that the interface of a "P–N" junction be as smooth as possible, because:

(1) Any protuberances on the interface will cause intense local fields which may initiate low back-voltage break-down. Therefore a smooth interface gives greater reliability.

(2) The constancy of the distance between the junctions determines the sharpness of the characteristics of the transistor.

(3) The smoother the interfaces resulting from a particular commercial process, the more uniform will be the characteristics of a resulting group of transistors.

*Further modifications*

The "P–N" junction formed by steps 1, 2 and 3 above (the collector junction) has uses independently of the subsequent steps of the process. Thus, it may be used as the collector junction of a transistor having the rest of its parts made in the ordinary manner, or some other manner. Also, this junction is well adapted for rectifier use.

In the above description, under step No. 3, first natural cooling, it is stated that the assembly is cooled to room temperature. This is done as a matter of convenience so that the assembly may be turned over and the second pellet added outside of the controlled atmosphere. But with suitable manipulative procedures, these operations can be carried out without removing the assembly from the protective atmosphere, in which case the assembly need be cooled only to some temperature slightly below the freezing temperature of pellet 17. This procedure will conserve heat, and will permit keeping pellet 17 in place while the assembly is turned up-side-down.

It will be understood, of course, that the heating operations described above are carried out in suitable protective atmospheres, and that the temperatures and times will be varied according to the different materials being used, but following the general principles outlined above.

*Possible materials*

The invention has been explained in connection with a transistor in which the base is composed of "N-type" germanium, and the "P-type" material for the emitter and acceptor is formed by fusing indium against the "N-type" gemanium. But the invention is not limited to those particular materials. Any other suitable semiconductor such as silicon, or a silicon-germanium alloy, may be substituted for the germanium as the main body of the transistor.

The "N-type" material may be produced by using any "donor" material, such as arsenic, phosphorus or bismuth, or alloys thereof, such as bismuth-antimony alloy. The "P-type" material may be formed by using any "acceptor" material, such as aluminum, gallium, or boron, or alloys thereof.

Also, instead of producing a "P–N–P type" of junction transistor, the method can be used to produce "N–P–N" transistors. Thus the body 16 may be formed of "P-type" germanium, and the pellets 17 and 22 may be formed of an antimony-germanium alloy, preferably the eutectic alloy or enriched with germanium slightly beyond the eutectic alloy.

*Conclusion*

The present invention produces superior and more uniform junctions, thus resulting in superior electrical devices and a lowering of costs due to fewer rejects during commercial production.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In the method of making junction transistors the steps comprising: placing a pellet comprising a doping impurity material selected from the group consisting of donors and acceptors on a body of a semiconductor material selected from the group consisting of silicon, germanium and silicon-germanium alloys, to form an assembly, heating the assembly to a first temperature above the melting point of the pellet material but below the melting point of the semiconductor material, whereby the pellet material melts, dissolves some of the semiconductor material and forms a button of a molten alloy of the two materials, and then cooling the assembly to a mean temperature of the order of 15° C. to 30° C. below said first temperature and maintaining a gradient so that the body of semiconductor material is at a lower temperature than the button of the molten alloy, the assembly being maintained at said mean temperature which is below the liquidus temperature of the alloy for a period of time thereby causing the semiconductor material to redeposit from the molten alloy upon the body of semiconductor material and for the doping material to diffuse into the semiconductor material.

2. A method as called for in claim 1 in which the pellets comprises indium and the semiconductor material is germanium.

3. A method as called for in claim 1 in which the pellet comprises germanium-indium alloy and the semiconductor is germanium.

4. A method as called for in claim 1 in which after the gradient cooling the assembly is subjected to a diffusion heating during which the assembly is held at a temperature just below the temperature reached at the end of the gradient cooling, thereby causing the impurity material to diffuse into the second type material.

5. In the method of making junction transistors, the steps comprising: placing a pellet comprising an impurity material on one portion of a body of a semiconductor material selected from the group consisting of silicon, germanium and silicon-germanium alloys, to form an assembly, heating the assembly to a first temperature above the melting point of the pellet material but below the melting point of the semiconductor material, whereby the pellet material melts, dissolves some of the semiconductor material and forms a button of molten alloy of the two materials, cooling the assembly to a mean temperature of the order of 15° C. to 30° C. lower than said first temperature and maintaining a gradient so that the body of semiconductor material is at a lower temperature than the button of the molten alloy, the assembly being maintained at the mean temperature which is below the liquidus temperature of the alloy for a period of time thereby causing the semiconductor material to redeposit from the molten alloy onto the body of semiconductor material and for the impurity material to diffuse into the semiconductor material, thereby forming a first junction on one side of the body of semiconductor material, and repeating the steps of the process for alloying a second pellet comprising an impurity material on another portion of the body of the semiconductor material, thereby forming a second junction on the body of semiconductor material, the temperature during the second alloying process at no time exceeding the first cooling temperature.

6. The method as called for in claim 5 in which both of the pellets comprise indium and the semiconductor material is germanium.

7. The method as called for in claim 6 in which both of the pellets comprise germanium-indium alloy and the semiconductor material is germanium.

8. The method of claim 6, in which the semiconductor material is silicon.

9. In the method of making junction transistors, the steps comprising: placing a pellet of an impurity material on a first side of a body of a semiconductor material selected from the group consisting of silicon, germanium and silicon-germanium alloys to form a preliminary assembly, heating the preliminary assembly to a first temperature above the melting point of the pellet material but below the melting point of the semiconductor material, whereby the pellet material melts, dissolves a part of the semiconductor material and forms a first button of molten alloy of the two materials, cooling the assembly so that the body of semiconductor material reaches and maintains a first cooling mean temperature of the order of 15° C. to 30° C. lower than the first temperature and slightly lower than that of the first button of molten alloy, the assembly being maintained at the mean temperature which is below the liquidus temperature of the alloy for a period of time thereby causing semiconductor material to redeposit from the molten alloy onto the first side of the body of semiconductor material and for the impurity to diffuse into the semiconductor material thereby forming a first junction on the first side of the body, thereafter rapidly cooling the preliminary assembly to a temperature substantially below the first cooling temperature whereby to solidify the first pellet, placing another pellet comprising an impurity material on the opposite side of the body of semiconductor material to form a final assembly, heating the final assembly to a second temperature slightly below the first cooling temperature but above the melting point of the second pellet whereby the second pellet melts, dissolves a part of the semiconductor material and forms a second button of molten alloy of the two materials, cooling the final assembly so that the body of semiconductor material is at a lower mean temperature of the order of 5° C. than the said second temperature and slightly less than the second button of molten alloy, thereby causing semiconductor material to redeposit from the second button of molten alloy upon the second side of the solid body of semiconductor material, thereby forming a second junction on said opposite side of the body of second type, and thereafter cooling the final assembly to room temperature.

10. The method as called for in claim 9 in which the pellet comprises indium and the semiconductor material is germanium.

11. The method as called for in claim 9 in which the semiconductor material is silicon.

References Cited in the file of this patent

UNITED STATES PATENTS

| | | |
|---|---|---|
| 2,449,484 | Jaffee | Sept. 14, 1948 |
| 2,560,594 | Pearson | July 17, 1951 |
| 2,561,411 | Pfann | July 24, 1951 |
| 2,597,028 | Pfann | May 20, 1952 |
| 2,629,672 | Sparks | Feb. 24, 1953 |
| 2,644,852 | Dunlap | July 7, 1953 |
| 2,701,216 | Seiler | Feb. 1, 1955 |
| 2,708,646 | North | May 17, 1955 |
| 2,725,315 | Fuller | Nov. 29, 1955 |
| 2,739,088 | Pfann | Mar. 20, 1956 |
| 2,742,383 | Barnes | Apr. 17, 1956 |
| 2,762,730 | Alexander | Sept. 11, 1956 |

FOREIGN PATENTS

| | | |
|---|---|---|
| 510,303 | Belgium | Apr. 15, 1952 |